United States Patent [19]

Todd

[11] 3,981,554
[45] Sept. 21, 1976

[54] METHOD OF AIR LETTING AN EVACUATED CATHODE RAY TUBE

[75] Inventor: Clinton Harvey Todd, Waubaushene, Canada

[73] Assignee: RCA Corporation, New York, N.Y.

[22] Filed: June 4, 1975

[21] Appl. No.: 583,605

[52] U.S. Cl. .......................................... 316/2; 316/28
[51] Int. Cl.² ............................................ H01J 9/50
[58] Field of Search ................................ 316/1, 2, 28

[56] References Cited
UNITED STATES PATENTS

| | | | |
|---|---|---|---|
| 3,063,777 | 11/1962 | Trax | 316/2 |
| 3,404,933 | 10/1968 | Weideman | 316/2 |
| 3,746,419 | 7/1973 | Hill | 316/2 |

*Primary Examiner*—Richard B. Lazarus
*Attorney, Agent, or Firm*—Glenn H. Bruestle; William H. Murray

[57] ABSTRACT

A weight is placed on the electrical connection pins extending from the stem of a cathode ray tube having a funnel portion and a neck portion. The neck portion is circumferentially cracked completely through between the funnel portion and the stem. The stem and the neck portion are placed within a hermetic chamber which is evacuated until the stem having the weight thereon separates from the funnel portion at the circumferential crack in the neck portion. The separated stem trips a switch which terminates the evacuation and enables the admission of an inert dry gas in a gradual manner to prevent contaminating particles from being conveyed inside the open tube. When the pressure of the inert gas inside the hermetic chamber is substantially equal to atmospheric pressure outside the chamber, the open tube is removed for further processing.

7 Claims, 4 Drawing Figures

Fig_2.

METHOD OF AIR LETTING AN EVACUATED CATHODE RAY TUBE

BACKGROUND OF THE INVENTION

This invention relates to the manufacture of electron tubes and particularly to an improved method for air letting an evacuated cathode ray tube.

Cathode ray tubes basically comprise a cathodoluminescent screen and at least one electron beam generating means contained within an evacuated envelope. The conventional cathode ray tube comprises a glass envelope having a funnel-shaped portion, the expansive section thereof having a terminal closure in the form of a faceplate panel with the cathodoluminescent screen disposed relative to the interior surface thereof, and the other end narrowing down into a neck portion. Within the neck portion, one or more electron guns are positioned in a manner to beam electrons to the screen. The neck portion normally terminates in a stem having an array of metallic pins extending therefrom which effect external electrical connections for the several internal components of the tube.

There are occasions when a tube is found to contain a malfunctioning or defective component, such as an electron gun assembly. A situation of this type may arise during tube manufacturing or as a result of tube operation. When the other components of the tube are considered to be satisfactory, it is the conventional and economical practice to repair the tube by removing the defective gun assembly and replacing it with a new one. Basically, this process involves disturbing the vacuum of the tube, removing defective electron gun assembly by cutting off a portion of the neck of the tube, resealing a new neck portion thereto, sealing a new mount assembly into the re-necked tube and exhausting and processing the repaired tube in accordance with conventional processing and aging practices.

The initial step in the repairing operation, as noted above, is that of disturbing the vacuum wherein the evacuated tube is opened and a fill of an inert, noncontaminating gas is admitted to prevent an inflow of contaminating gases such as oxygen, carbon dioxide, water vapor and the like, which, if sorbed by the internal parts of the tube, would be detrimental to subsequent tube operation. It has been conventional practice to carefully puncture the neck of the tube in the presence of a surrounding noncontaminating atmosphere and allow this atmosphere to flow through the opening and fill the tube. Usually, the puncture operation is consumated in one of two ways, either by utilizing a heated metallic tip to melt a hole in the glass or by boring a hole therethrough by means of a rapidly revolving drill. Both of these methods have disadvantages in that heat releases gaseous contaminants such as water vapor and objectionable hydroxides from the adjacent glass, and drilling produces fine chips and particle glass materials. Thus, as the vacuum in the tube is disturbed, the aforementioned and other deleterious gas borne foreign materials, ambient to the tube, are undesirably sucked into the interior of the envelope, and are undesirably sorbed or adhered to the surfaces included therein. While a portion of these contaminants can be removed by subsequent tube processing, for example by knocking, some of the contaminants remain as potentially troublesome deterrents to desirable performance of the repaired tube.

Another method sought to circumvent the aforementioned problems by breaking the glass exhaust tubulation or evacuation seal within an evacuated hermetic chamber, as disclosed in U.S. Pat. No. 3,404,933 issued to R. J. Weidman. Although this method solved the problem of the initial surge of incoming gas sweeing contaminating particles and other contaminants into the tube, the breaking of the exhaust tubulation by impact from a plunger generates many small glass particles, some of which may enter the tube as a result of the impact force of the plunger and be further swept into the tube by the controlled emission of the inert gas. In addition, this method adds at least one superfluous step, that of smashing the exhaust tubulation, since the neck of the tube must ultimately be cracked and the mount assembly removed before tht tube can be re-necked and a new mount assembly installed.

SUMMARY OF THE INVENTION

In a method for repairing an evacuated cathode ray tube having a glass envelope with a funnel portion and a neck portion, and a stem with electrical connection pins extending therefrom attached to the neck portion, wherein the evacuated tube is initially opened, a defective component replaced by one of desired quality and the tube is then re-evacuated and sealed, an improvement in the method of initially opening the evacuated tube which comprises the following steps. First, the neck portion of the glass envelope is circumferentially cracked completely through between the stem and the funnel portion. Next, the pressure of environmental atmosphere surrounding the tube is removed while applying a separation force to the stem until the stem separates from the funnel portion. A non-contaminating gaseous atmosphere is then admitted into the open tube as a gaseous fill to prevent a subsequent inflow of contaminants into the tube.

DETAILED DESCRIPTION

Figure 1:
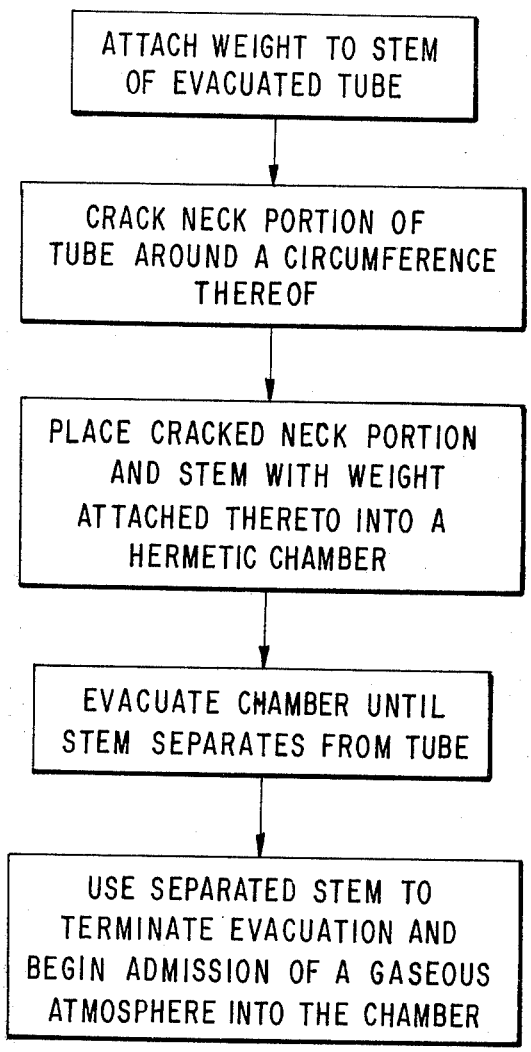
FIG. 1 is a flow diagram showing the steps of the improved method.

According to the flow chart of FIG. 1, the initial air letting of an evacuated and sealed cathode ray tube, having a glass envelope with a funnel portion which narrows down to a neck portion, and a stem having electrical connection pins extending therefrom attached to the neck portion, is accomplished as follows. A weight is attached to the stem of the tube. In the preferred embodiment, the weight has a mating receptacle which fits onto and mechanically grasps the electrical connection pins extending from the stem. A circumferential crack is then made in the neck portion in a predetermined position between the stem and the funnel portion. The crack extends completely through the glass envelope around the circumference of the neck portion. The tube then is placed in a tube support in a substantially vertical orientation with the stem being in a downward position, and the stem and the cracked neck portion oriented within a hermetic chamber.

The chamber is then evacuated until the gravitational force exerted on the weight and the stem overcomes the forces on the stem due to friction and the pressure differential between the inside and the outside of the glass envelope. As a result, the stem separates from the funnel portion at the circumferential crack in the neck portion. The separated stem, with the weight attached thereto, trips a switch within the hermetic chamber which terminates the evacuation and enables the admission of a non-contaminating gaseous atmosphere into the hermetic chamber in a gradual controlled manner.

Figure 2:
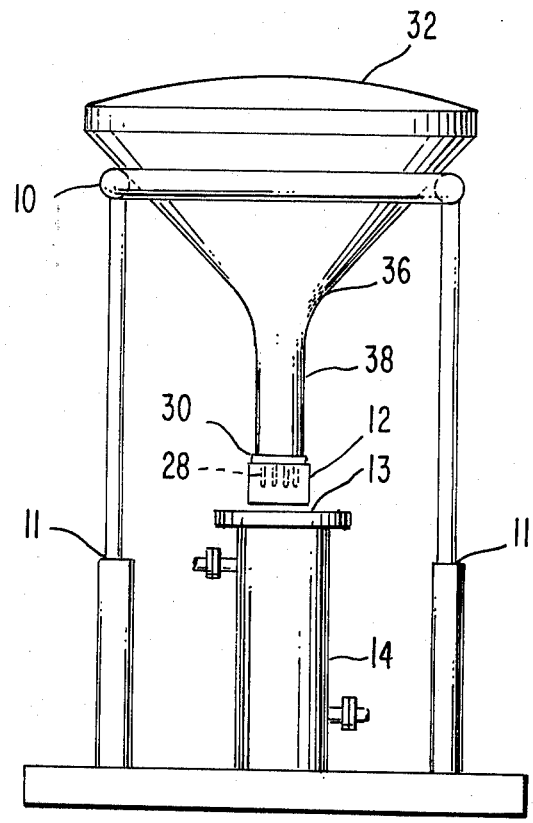
FIG. 2 is a perspective view of an apparatus used in practicing the improved method disclosed herein.

One form of apparatus which can be used to practice the improved method disclosed herein is shown in FIG. 2. This apparatus comprises a tube cradle 10, mounted on a pair of counterbalanced slideable supports 11, for supporting a cathode ray tube 32 having a glass envelope 34 with a funnel portion 36 and a neck portion 38, and a stem 30 with electrical connection pins 28 extending therefrom, attached to the neck portion 38. The cradle 10 supports the cathode ray tube 32 in a substantially vertical orientation with the stem 30 in a downward position initially disposed above an opening 13 in a vacuum chamber 14.

Prior to placing a cathode ray tube on the tube cradle 10, a weight 12 is attached to the stem 30 of the tube 32 by inserting the electrical connection pins 28 into a mating receptacle located in the weight 12. The neck portion 38 of the cathode ray tube 32 is then circumferentially cracked completely through the glass envelope 34 at a desired location between the stem 30 and the funnel portion 36, indicated in FIG. 3 by the line 40, with a flame on a vertical lathe (not shown). Typically, this operation requires three revolutions with the flame, a mechanical shock applied to the heated area by a metal bar, and three more revolutions with the flame.

After the neck portion 38 of the cathode ray tube 32 has been circumferentially cracked therethrough, the tube 32 is placed on the tube cradle 10. At this point, even though the neck is cracked completely through, the stem is held to the funnel portion of the tube by the forces due to friction and the pressure differential between the inside and the outside of the glass envelope. The tube 32 is then lowered using the slideable supports 11, causing the cracked neck portion 38 and the stem 30, with the weight 12 attached thereto, to be lowered through the opening 13 into the vacuum chamber 14 until the funnel portion 36 comes to rest against a vacuum seal 42 surrounding the opening 13 as shown in FIG. 3.

Figure 3:
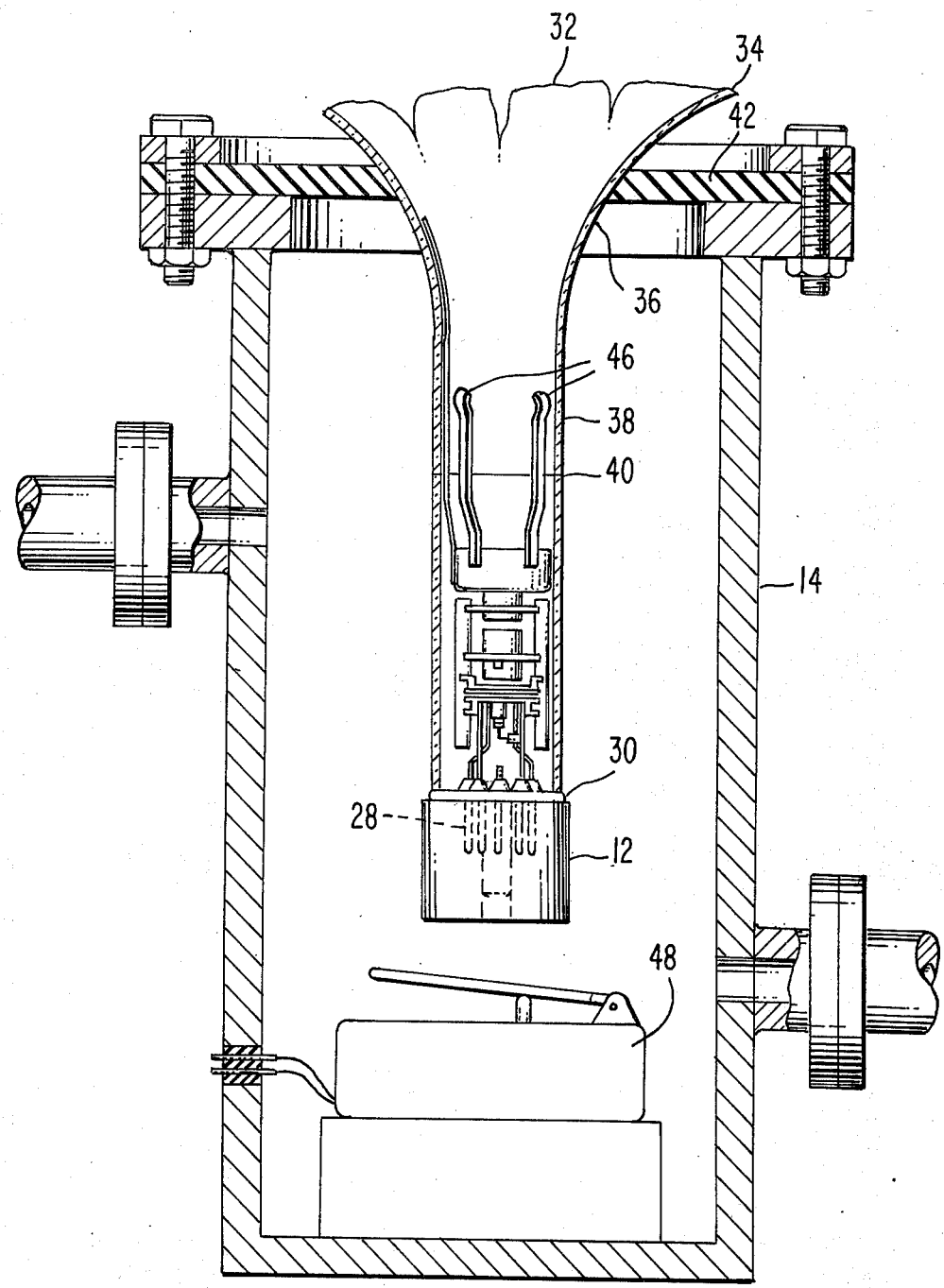
FIG. 3 is an enlarged sectional view of a hermetic chamber, having a neck portion and stem of a cathode ray tube positioned therein, used in practicing the improved method shown herein.
Figure 4:
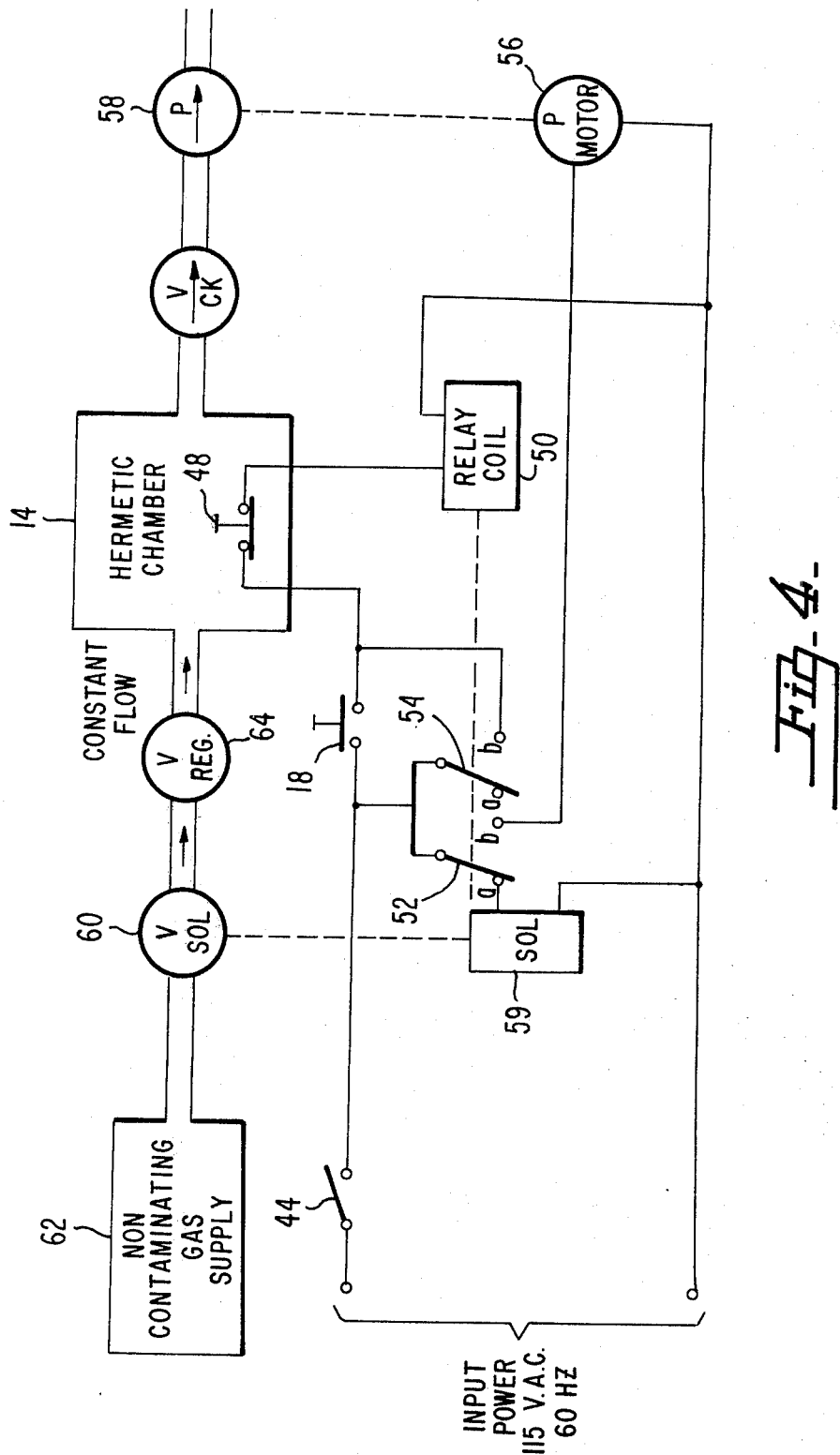
FIG. 4 is a schematic diagram of the apparatus used in practicing the improved method disclosed herein.

Referring to FIGS. 3 and 4, the operation of the apparatus is as follows. A power switch 44 is closed turning the system on. A start switch 18 is depressed, causing a relay coil 50 to become energized. Energizing the relay coil 50 causes associated relay switches 52 and 54 to operate. Switch 54 moves from position $a$ to position $b$ causing the relay coil 50 to remain energized after the start switch 18 has been released. Switch 52 moves from position $a$ to position $b$ causing a vacuum pump motor 56 to be energized. The vacuum pump motor 56 drives a vacuum pump 58 which begins evacuating the vacuum chamber 14 of the environmental atmosphere therein. At the same time, the movement of switch 52 from position $a$ to position $b$ causes power to be removed from a solenoid 59 which operates a solenoid valve 60. Removing the power from the solenoid 59 causes the solenoid valve 60 to close thereby preventing gas from a non-contaminating gas supply 62 from entering the vacuum chamber 14.

The vacuum pump 58 continues to evacuate the vacuum chamber 14 until the gravitational force exerted on the weight 12, see FIG. 3, overcomes the forces on the stem 30 due to the pressure differential between the inside and the outside of the glass envelope 34 and the frictional forces between bulb spacers 46 and the glass envelope 34. At this time, the stem 30 will separate from the funnel portion 36 at the circumferential crack 40 in the neck portion 38 and fall toward the bottom of the vacuum chamber 14.

The falling stem 30 with the weight 12 attached thereto will strike a switch 48 positioned in the bottom of the vacuum chamber 14. Upon being impacted by the weight 12, the switch 48 will open, causing the voltage to be removed from the relay coil 50. This causes the switch 52 to move from position $b$ to position $a$ thereby removing power from the vacuum pump motor 56. At the same time, movement of switch 52 to position $a$ causes power to be applied to the solenoid 59, causing the solenoid valve 60 to open thereby permitting gas from the non-contaminating gas supply 62 to enter the vacuum chamber 14. The rate of flow of non-contaminating gas into the vacuum chamber 14 is controlled by a regulator valve 64.

When the pressure of the non-contaminating gas within the vacuum chamber 14 is substantially equal to the pressure of the atmosphere outside the vacuum chamber, the tube 32 will rise slightly from the vacuum chamber. This is due to the vacuum seal 42 returning to its original position. At this point, the cathode ray tube 32 can then be removed from the chamber 14.

The actual mass of the weight 12 is not critical except that it must be great enough to overcome the friction of the bulb spacers 46 against the glass envelope 34. On a cathode ray tube which does not use bulb spacers, no external weight would be required since the stem 30 would separate and fall of its own weight.

As used herein, the term "non-contaminating gas" means a gas which does not include sufficient amounts of any constituents such as water vapor, oxygen, or carbon dioxide, which, if permitted to come into contact with internal parts of the tube, would result in impairing normal tube operation or life expectancy after exhaust and resealing. Inasmuch as water vapor is believed to constitute the most harmful contaminant encountered when tubes are open to the atmosphere, a prime prerequisite of the gas filling according to the invention disclosed herein is that it be dry, that is, free of harmful amounts of water vapor. Moreover, the dry gas employed should be one which itself does not in any way destructively contaminate the tube parts and coatings within the tube envelope.

In order to best ensure the absence of any contaminating or poisoning gases, an inert gas such as argon, helium, neon, or the like, can be used. However, inasmuch as nitrogen is non-reactive with the tube parts involved, and further, since nitrogen is relatively inexpensive and easy to provide in a substantially dry condition, it may also be used in practicing the method disclosed herein. In addition, since water vapor constitutes the chief contaminant, dry air can also be used. The air can be passed over or through a carbon dioxide absorber to further decrease the contaminants.

The improved method comprising the invention disclosed herein, has many advantages over the prior art methods of air letting evacuated tubes. One advantage lies in the fact that the circumferential cracking of the tube neck takes place outside of the vacuum chamber thereby precluding the possibility of contaminating the vacuum chamber in the open tube itself with minute particles of glass. Another advantage lies in the fact that this method can be practiced with a minimum of intervention by an operator. The falling stem terminates evacuation and starts the controlled pressurization of the vacuum chamber automatically. Consequently, the operator merely inserts the cracked tube into the apparatus, turns the apparatus on, presses a start button, and removes the de-necked tube.

I claim:

1. In a method for repairing an evacuated cathode ray tube having a glass envelope with a funnel portion and a neck portion and having a stem, with electrical connection pins extending therefrom, attached to said neck portion, wherein the evacuated tube is initially opened, a defective component replaced by one of desired quality and the tube is re-evacuated and sealed, an improvement in the method of initially opening the evacuated tube comprising the steps of:
   a. cracking through the neck portion of said glass envelope around a circumference thereof between said stem and said funnel portion;
   b. then positioning said tube in support means in a substantially vertical orientation with said stem being in a downward position and said stem and said neck portion being oriented within a hermetic chamber;
   c. evacuating said chamber until the gravitational force exerted on said stem overcomes the forces on the stem due to friction and the pressure differential between the inside and outside of said envelope, causing said stem to separate from said funnel portion at the circumferential crack in said neck portion; and
   d. using said separated stem to effect the cessation of further chamber evacuation and the start of a gradual admission of a non-contaminating gaseous atmosphere into said open tube as a gaseous fill so as to prevent a subsequent inflow of contaminants into said tube.

2. The method in accordance with claim 1 wherein step a) includes the steps of applying heat to said neck portion in a localized circumferential area between said stem and said funnel portion and applying a mechanical shock to the heated circumference, said steps being repeated until said glass envelope is cracked therethrough.

3. The method in accordance with claim 2 in which step b) includes the additional step of attaching a weight to said stem.

4. The method in accordance with claim 3 comprising the additional step of removing the tube from the hermetic chamber after said non-contaminating, gaseous atmosphere attains a pressure substantially equal to that of said environmental atmosphere.

5. The method in accordance with claim 4 wherein said non-contaminating, gaseous fill comprises an inert dry gas.

6. The method in accordance with claim 4 wherein said non-contaminating gaseous fill comprises dry air.

7. In a method for repairing an evacuated cathode ray tube having a glass envelope with a funnel portion and a neck portion and having a stem with electrical connection pins extending therefrom attached to said neck portion wherein the evacuated tube is initially opened, a defective component replaced by one of the desired quality and the tube is re-evacuated and sealed, an improvement in the method of initially opening the evacuated tube comprising the steps of:
   a. inserting said electrical connection pins into a mating receptacle in a weight;
   b. rotating the tube and applying a flame to the neck portion of said glass envelope causing localized heating around a circumference of said neck portion;
   c. applying a mechanical shock to the heated circumference and reapplying said flame to the neck portion until said neck portion is cracked completely through around the circumference thereof;
   d. then positioning said tube in support means in a substantially vertical orientation with said stem being in a downward position, and said stem and said cracked neck portion being oriented within a hermetic chamber;
   e. evacuating said chamber of environmental atmosphere therein until the gravitational force exerted on said weight attached to said stem overcomes the forces on the stem due to friction and the pressure differential between the inside and outside of said envelope causing said stem to separate from said funnel portion at the circumferential crack in said neck portion and using said separated stem with the weight attached thereto to effect the cessation of further chamber evacuation and the start of admission of a non-contaminating gaseous atmosphere into said chamber;
   f. admitting said gaseous atmosphere into said chamber in a gradual manner to prevent the conveyance of contaminated particles into said open tube until said gaseous atmosphere attains a pressure substantially equal to that of said environmental atmosphere; and
   g. removing said tube from the support means and the hermetic chamber.

* * * * *